United States Patent [19]

Scarborough et al.

[11] Patent Number: 5,338,345
[45] Date of Patent: Aug. 16, 1994

[54] WATER-BASED WATER REPELLENT COATING COMPOSITIONS

[75] Inventors: Victoria D. Scarborough, Memphis, Tenn.; David A. Czekai, Honeoye Falls, N.Y.; Jeffery E. G. Powell, Blountville, Tenn.

[73] Assignee: Eastman Kodak Company, Rochester, N.Y.

[21] Appl. No.: 191,240

[22] Filed: Feb. 3, 1994

Related U.S. Application Data

[63] Continuation-in-part of Ser. No. 59,082, May 5, 1993, abandoned.

[51] Int. Cl.$^5$ ............................................. C09D 5/20
[52] U.S. Cl. ........................................ 106/2; 106/271; 106/285; 106/287.23; 106/287.24; 427/372.2; 427/384
[58] Field of Search ................... 106/2, 271, 272, 285, 106/287.23, 287.24; 427/372.2, 384

[56] References Cited

U.S. PATENT DOCUMENTS

| | | | |
|---|---|---|---|
| 3,915,921 | 10/1975 | Schlatzer, Jr. | 526/238.23 |
| 4,421,902 | 12/1983 | Chang et al. | 526/317 |
| 4,509,949 | 4/1985 | Huang et al. | 526/317 |
| 4,648,904 | 3/1987 | DePasquale et al. | 106/2 |
| 4,741,773 | 5/1988 | Kuroda et al. | 106/2 |
| 4,923,940 | 5/1990 | Hsu | 526/208 |
| 4,996,274 | 2/1991 | Hsu | 526/208 |
| 5,004,598 | 4/1991 | Lockhead et al. | 424/59 |
| 5,049,186 | 9/1991 | Kawabata | 106/2 |
| 5,120,355 | 6/1992 | Imai | 106/2 |
| 5,196,054 | 3/1993 | Schmuck et al. | 106/2 |
| 5,205,860 | 4/1993 | Narula et al. | 106/2 |
| 5,226,954 | 7/1993 | Suzuki | 106/2 |

FOREIGN PATENT DOCUMENTS

| | | | |
|---|---|---|---|
| 0472973 | 3/1992 | European Pat. Off. | B27K 13/50 |
| 47-3731 | 2/1972 | Japan | 106/2 |
| 62-138579 | 6/1987 | Japan | 106/2 |
| 1153784 | 6/1989 | Japan | 106/2 |

OTHER PUBLICATIONS

Lockhead et al., "Hydrophobically Modified Carbopol Resins" Soap/Cosmetics/Chemical Specialities, pp. 28–33 and 84–85, May 1987.
BF Goodrich, Carbopol 1382 Bulletin, TDS #149 (No date).
BF Goodrich, Pemulen Polymeric Emulsifiers Bulletin, pp. 1–4 (No date).
BFGoodrich, Creating Emulsions with Carbopol 1600–Series Polymers, Bulletin IS-9, Revised Apr. 1992.

Primary Examiner—Anthony Green
Attorney, Agent, or Firm—J. Jeffrey Hawley

[57] ABSTRACT

There is provided a water based water repellent coating composition, method of making and method of use. The coating composition comprises an emulsion having water as the continuous phase and, as the discontinuous phase, droplets of a nonvolatile organic water repellent composition, the emulsion containg an emulsion stabilizing amount of a hydrophobically modified polyacrylic acid polymer wherein the viscosity of the emulsion is less than about 100 Cps and the particle size of the droplets is less than about 50 microns. The relatively low viscosity and small particle size provides for easy application and excellent penetration into porous substrates. The process of making the compositions involves the making of a conventional emulsion of this type and then high kinetic energy processing so as to produce the desired viscosity and particle size. The method of use involves the application of the composition to a substrate followed by evaporation of the water and any volatile components from the composition.

17 Claims, No Drawings

WATER-BASED WATER REPELLENT COATING COMPOSITIONS

CROSS REFERENCE TO RELATED APPLICATIONS

This application is a continuation-in-part of U.S. Ser. No. 059,082, filed May 5, 1993, and now abandoned.

FIELD OF THE INVENTION

This invention relates to water repellent coating compositions for making substrates water repellent, a method for making such compositions and a method of making a substrate water repellent.

BACKGROUND OF THE INVENTION

Water repellent coating compositions or sealers are generally low viscosity, colorless, penetrating liquids. One of the primary functions of these water repellent coating compositions is to prevent the penetration of liquid water into the pores of the substance to which the composition is applied. These water repellent penetrating compositions are designed to waterproof a variety of dry, porous substrates such as wood, brick, and concrete.

Water repellent coating compositions typically contain a nonvolatile composition. This nonvolatile composition contains the active water repellent ingredients. These ingredients remain on and penetrate into the treated substrate after the coating composition is applied and the liquid carrier evaporates. The active water repellent ingredients contained in the nonvolatile composition can include a variety of materials. These materials include various waxes, resins, acrylics, fragrances, preservatives and surface tension modifying chemicals.

The carrier used in a typical water repellent coating composition is usually a volatile organic compound ("VOC") so that the entire composition is organic. Recent actions by the Federal government to strengthen the air quality laws at the national level indicate that in the near future, all states will be required to mandate that only low VOC products be offered for sale nationwide. This reality has served to drive the research towards development of water-based equivalents to typical water repellent compositions that are consumer-acceptable. Research in the development of a consumer acceptable water-based water repellent coating composition has been ongoing for quite some time.

Unfortunately, the conventional surfactants that are used in these compositions are not typically volatile compounds and thus, when coated, remain after the water carrier evaporates. The hydrophilic portion of these compounds remain in the resulting coating and thus, greatly reduce the water repellency.

One potential alternative to the use of conventional surfactants are the recently developed hydrophobically modified high molecular weight polyacrylic acid copolymers. These compounds are typically used as thickening agents, primarily in cosmetic compositions. However, they also can serve as primary emulsifiers in oil-in-water emulsions and can emulsify compositions such as linseed oil, epoxy resins and asphalt. (Reference is made to BFGoodrich product bulletin "IS-9", *CREATING EMULSIONS WITH CARBOPOL 1600-SERIES POLYMERS;* and U.S. Pat. Nos. 4,923,940 and 4,966,274, assigned to BFGoodrich)

However, being primarily thickening agents, it is not surprising that these polymers produce coating compositions with conventional water repellent nonvolatiles that are quite viscous and thus, very difficult to apply in a manner similar to the VOC based water repellent compositions. In addition, the high viscosity inhibits the penetration of these compositions into porous substrates and this is undesirable.

Thus, there remains the need for water based water repellent coating compositions that can be easily applied and that can easily penetrate porous substrates. At the same time, the coatings that result from these compositions should provide excellent water repellancy, unlike compositions of this type that use conventional surfactants.

SUMMARY OF THE INVENTION

In accordance with the present invention, there is provided a composition which renders porous substrates water repellent including, but not limited to, wood, concrete, and masonry. The formula does not utilize traditional surfactant technology. The water repellency properties of the compositions of this invention exceed the established criteria as specified by federal specifications for waterproofing wood, concrete and masonry- In addition, the compositions can be very low in VOC content.

Thus, in accordance with the present invention there is provided an emulsion having water as the continuous phase and, as the discontinuous phase, droplets of a nonvolatile organic water repellent composition, the emulsion containing an emulsion stabilizing amount of a hydrophobically modified polyacrylic acid polymer wherein the viscosity of the emulsion is less than about 100 Cps and the particle size of the droplets is less than about 50 microns.

Conventional compositions using hydrophobically modified polyacrylic acid polymers as the emulsion stabilizer, as noted above, are quite thick, often 1000 Cps and usually much more. One method of achieving the desired viscosity and particle size according to the invention is to use a process that produces high kinetic energy, e.g. high sheer, after the initial emulsion is formed. It is surprising that the thick compositions that are usually formed could be successfully transformed into particularly useful low viscosity emulsions with low particle size. It is particularly surprising since the product literature mentioned above specifically teaches away from high sheer processing. ("Controlled homogenization may be useful, but emulsion instability could result from high sheer.") Because of the low viscosity, the present compositions are easy to apply; because of the low particle size penetrate porous substrates well; and in addition, produce coatings that have excellent water repellency.

Thus, in another aspect of the invention, there is provided a process for producing an emulsion having water as the continuous phase and, as the discontinuous phase, droplets of a nonvolatile organic water repellent composition, the emulsion containing an emulsion stabilizing amount of a hydrophobically modified polyacrylic acid polymer, said process comprising the steps of:

a) forming a liquid nonvolatile organic water repellent composition;

b) forming a water solution of an emulsion stabilizing amount of a hydrophobically modified polyacrylic acid polymer;

c) neutralizing the water solution formed in b);

d) mixing the composition from a) with the neutralized water solution from b) so as to form an emulsion; and e) subjecting the emulsion formed in d) to high kinetic energy processing until the viscosity of the emulsion is less than about 100 Cps and the particle size of the droplets is less than about 50 microns.

In yet another aspect of the invention there is provided a process for making an architectural material water repellent, the process comprising the steps of:

a) coating the material with the composition of the invention defined above; and b) allowing the water continuous phase to evaporate.

DETAILS OF THE INVENTION

The hydrophobically modified polyacrylic acid polymer emulsion stabilizers are described, for example, in U.S. Pat. Nos. 4,421,902, 3,915,921, 4,509,949, 4,923,940, 4,996,274 and 5,004,598. These polymers have a large water-loving portion (the polyacrylic acid portion) and a smaller oil-loving portion (typically derived from a long carbon chain acrylate ester). The polymers can be dissolved in water. Neutraliztion with base causes the formation of a gel. Useful polymers are sold as Carbopol ® 1342 (a copolymer of acrylic acid and a long chain alkyl methacrylate), 1382 (hydrophobically-modified, crosslinked acrylic acid polymer) and high molecular weight hydrophobically modified Carbopols ® such as 1621, 1622, 1623 and Pemulan ® TR1 and TR2 which are similar to Carbopol ® 1382, all available from BFGoodrich. A similar composition, Rheolate ® 5000 is available from Rheox Inc. Heighstown, N.J.

Preferred are Carbopol ® 1342 and Pemulan ® TR2. These compounds are described in U.S. Pat. No. 4,509,949, the disclosure of which is hereby incorporated by reference. Thus, it is a polymer derived from a monomeric mixture containing:

a) 95.9 to 98.8 weight percent of an olefinically unsaturated carboxylic monomer selected from the group consisting of acrylic, methacrylic and ethacrylic acids, b) about 1 to about 3.5 weight percent of an acrylate ester of the formula:

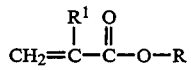

wherein R is an alkyl radical containing 10 to 30 carbon atoms and $R^1$ is hydrogen, methyl or ethyl; and c) 0.1 to 0.6 weight percent of a polymerizable crosslinking polyalkenyl polyether of a parent alcohol containing more than one alkenyl ether group per molecule wherein the parent alcohol contains at least 3 carbon atoms and at least 3 hydroxyl groups.

The 1621 compound is described in U.S. Pat. No. 4,923,940 (Divisional 4,996,274), the disclosures of which are hereby incorporated by reference, and thus is a polymer derived from a monomeric mixture containing:

a) at least 85% by weight olefinically unsaturated monocarboxylic and dicarboxylic acids and salts thereof containing 3 to 5 carbon atoms, preferably monocarboxylic acids, salts and anhydrides thereof; and b) up to about 15% by weight of monomers which contain at least one terminal $CH_2=C<$ or vinylidene group.

The olefinically unsaturated monocarboxylic and dicarboxylic acids and salts thereof containing 3 to 5 carbon atoms are preferably selected from the group consisting of acrylic, methacrylic and ethacrylic acids (as above in connection to the polymers from '949) and the monomers which contain at least one terminal $CH_2=C<$ or vinylidene group are preferably similar to the acrylate esters described above except that the R group has from 1 to 30 carbon atoms rather than 10 to 30. These polymers are characterized in that they are prepared in a reaction medium containing an organic solvent and a hydrocarbon solvent in respective weight ratio of 95/5 to 1/99, the organic solvent being selected from ketones, esters, ethers and alcohols having solubility parameter in the range of 8 to 15 and the hydrocarbon solvent being selected from aliphatic and cyclic aliphatic alkanes containing 4 to 12 carbon atoms and non-benzene aromatics of 7 to 9 carbon atoms.

Other useful polymers of this type are described in U.S. Pat. No. 5,004,598, the disclosure of which is hereby incorporated by reference. These polymers are derived from a preponderant amount of a carboxylic monomer and a lesser amount of a long chain acrylate ester. The amount of the carboxylic monomer can be in the range of 50 to 99% by weight, preferably 80 to 99% by weight, and especially 90 to 98% by weight whereas amount of the acrylate ester can be in the range of 1 to 50% by weight, preferably 1 to 20% by weight, especially 2 to 10% by weight. Amounts of the carboxylic monomer and the acrylate ester are based on the combined weight of both components. It should be understood that more than one carboxylic monomer and more than one acrylate ester can be used in the monomer charge.

The modified polymers can optionally be crosslinked by inclusion in the monomer charge of a suitable crosslinker in amount of about 0.1 to 4%, preferably 0.2 to 1% by weight based on the combined weight of the carboxylic monomer and the acrylate ester. The crosslinker is selected from polymerizable monomers which contain a polymerizable $CH_2=C<$ group and at least one other polymerizable group, the unsaturated bonds of which are non-conjugating with respect to each other.

Production of the copolymers employs a monomeric mixture which contains two essential monomeric ingredients, each in certain proportions, one being a monomeric olefinically-unsaturated carboxylic monomer of 3 to 6 carbon atoms and the other being an acrylic ester having a long chain aliphatic group. Optionally, there is included in the monomeric mixture a crosslinking monomer. The amount of the carboxylic monomer is generally in a major proportion. In a preferred embodiment, the amount of the carboxylic monomer is 80 to 99% but especially 90 to 98% by weight whereas amount of the comonomer is 20 to 1, especially 10 to 2 weight percent, based on the weight of the two monomers.

The preferred carboxylic monomers are the mono-olefinic acrylic acids having the general structure

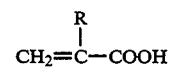

wherein R is a substituent selected from the class consisting of hydrogen, halogen, hydroxyl, lactone, lactam, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic acid itself is most preferred because of its generally lower cost, ready availability, and ability to form superior polymers. Another particularly preferred carboxylic monomer is maleic anhydride.

The preferred acrylic ester monomers having long chain aliphatic groups are derivatives of acrylic acid represented by the formula:

wherein $R^1$ is selected from hydrogen, methyl and ethyl groups and $R^2$ is selected from alkyl groups having from 8 to 30 carbon atoms and oxyalkylene and carbonyloxyalkylene groups are particularly oxyethylene and carbonyloxyethylene groups. Representative higher alkyl acrylic ester are decyl acrylate, lauryl acrylate, stearyl acrylate, behenyl acrylate and melissyl acrylate, and the corresponding methacrylates.

The nonvolatile organic water repellent composition in the compositions of the invention is conventional. Compositions which themselves are liquids (e.g. linseed oil) can be used. In addition, compositions which are normally solids can be dissolved in an organic solvent to form the necessary liquid for the formation of an emulsion with water. Obviously, the amount of organic solvent will be very much less than the amount in a conventional VOC based composition. The composition of the invention will still have significantly reduced VOC content.

The nonvolatile organic water repellent composition can include natural and synthetic waxes. Useful waxes can be selected from the group consisting of paraffinic waxes, microcrystalline waxes, mineral waxes, vegetable waxes, animal waxes, hydrocarbon waxes, organometallic waxes such as aluminum stearates, zinc stearates, and polyoxoaluminum monostearate, hydrogenated oil waxes, chlorinated waxes, and mixtures of such waxes. Paraffin wax is most preferred.

Paraffin waxes generally contain about 14 different straight chain and branched hydrocarbons ranging from $C_{18}H_{38}$ to $C_{32}H_{66}$ and solidify between about 27° C. and about 70° C. (between about 80° F. and about 158° F.). According to this invention, the preferred paraffin waxes have melting points in the range of about 50° C. to about 70° C., more preferably from 55° C. to 65° C., for long-term durability of water-repellent properties.

The nonvolatile organic water repellent composition can also include hydrocarbon resins as inert hydrophobic filler to provide the coating composition with an additional solid base and binder for the wax or other components. Such a hydrocarbon resin imparts the coating composition with long term durability. Among the hydrocarbon resins which can be used in the invention there can be mentioned aromatic hydrocarbon resins, aliphatic resins and mixtures thereof. Typical aromatic resins include indene, styrene, methylindenes and methyl styrene. Typical aliphatic resins include cis- and trans-piperylene. Polyisobutylene, a highly viscous hydrocarbon, can be used as a filler and provides long term durability and flexibility to the coatings made from the compositions of the invention. Preferred hydrocarbon resins include a hydrogenated C5 hydrocarbon resin with a dropping point temperature of about 140° C. C5 hydrocarbon resins are well known compositions that are commercially available. The preferred C5 resin is Escarez® 5340 available from Exxon Chemical. Other useful C5 resins include Eastotac® resins available from Eastman Chemical Company and Nevrez® resins available from Neville. Mixtures of hydrocarbon resins are also useful. Particularly preferred are mixtures of hydrogenated C5 resins and polyisobutylene.

Other compositins can be used and the nonvolatile organic water repellent composition such as silicone resin (for example Corning Fluid 200), a fluoroalkyl resin such as Dupont Zonyl® PHS, an alkyd including long oil and medium oil alkyds and drying oils such as linseed oil and tung oil.

The nonvolatile organic water repellent composition can also include preservatives such as 3-iodo-2-propenyl butyl carbamate (commercially available as Polyphyse® P100 available from Troy Chemical Co.), copper nathanate, zinc nathanate, chlorothalanil (tetra chloroisophthalonitrile) and 2-(thiocyanomethylthio) benzothiazole. Useful preservatives include those above which provide for preservation of the coated composition against, for example mildew, as well as bacteriostatic perservatives which protect the composition in the container before application. A particularly useful bacteriostatic preservative is a bicyclic oxazolidines solution, commercially available as Nuosept® 95 available from Huls America Inc. This composition also serves the function of neutralizing the hydrophobically modified polyacrylic acid polymer.

Fragrances may also be incorporated in the nonvolatile organic water repellent composition such as pine oil, benzaldehyde and lemon oil.

As noted, the nonvolatile organic water repellent composition may require a small amount of volatile organic solvent so that the emulsion can be formed. Useful volatile organic solvents are mineral spirits, mineral oil, naphtha, petroleum distillates such as Stoddard's solvent, and ester alcohols such as Texanol® available from Eastman Chemical Company. Mixtures of solvents can also be used. The most preferred solvents are naphtha and mineral spirits.

Surface tension modifiers can be included in the water repellent coating compositions of the invention so as to improve coatability. These materials lower the surface tension of the composition so that the composition will "wet" the substrate thereby facilitating the application process. While typical surface tension modifiers are surfactant like materials, they are not used in the compositions of the invention in an amount that seriously adversely affects the water repellency of the coated substrate. Useful surface tension modifiers include those marketed under the trade names Surfynol® 104 and Surfynol® TG available from Air Products and Chemicals Inc., Allentown Pa. The major ingredient in these surface tension modifiers is: 2,4,7,9,-tetramethyl-5-decyne-4,7,diol. Other surface tension modifiers and mixtures of modifiers can also be used.

The compositions of the invention can also include conventional pigments and other colorants. Useful pigments include red iron oxide, yellow iron oxide and brown iron oxide. The pigments and colorants are present in conventional amounts.

In accordance with the present invention, the viscosity of the composition is less than about 100 Cps and preferrably between about 5 and 100 and still more preferrably about 15-20 Cps. Viscosity is measured in a conventional manner. Specifically, viscosity can be measured using a Brookfield Viscometer Model DV-II. In this method, the torque required to rotate a member through the composition is measured and related to viscosity characteristics. The member that is rotated through the composition is preferably a spindle #00 using the UL adapter with a rotation speed of 100 RPM. While the viscosity of the present compositions is not highly dependent on temperature, it is preferred that the measurement is performed at a temperature of about room temperature.

Similarly, the particle size of the droplets in the emulsion can be measured in a conventionsl manner. Particle size is preferably measured using a Leeds and Northrop FRA Analyzer. In accordance with the invention, the particle size is less than about 50 microns and more preferably between about 0.5 and 50 microns. By particle size, we mean the mean volume particle diameter.

The composition of the present invention can be made by first forming a relatively high viscosity, conventional emulsion of this general type. For example, the nonvolatile organic water repellent composition is first formed so that it is a liquid composition. The ingredients for this oil phase are dissolved into an organic solvent if necessary such as petroleum distillate solvent. This composition can be heated to facilitate the dissolution of the components, for example up to about 200° F. (about 93° C.) In another vessel, water and the hydrophobically modified polyacrylic acid polymer are stirred together until the emulsifier is dissolved into the water. The water mixture is neutralized with a base, typically an amine and preferrably ammonia. By "neutralized" we mean that the pH of the composition is adjusted to be between about 5 and 8. (The pH before this step is typically between about 3 and 4.) The mixture goes from a thin low viscosity to a thicker viscosity after neutralization. The nonvolatile organic water repellent composition is then added to the water mixture and a milky emulsion is formed immediately. This milky emulsion can be vigorously stirred if desired to facilitate the formation of the emulsion. The last ingredient, a surface tension modifier if desired, is then added to lower the surface tension of the product so it will wet the substrate.

In a preferred embodiment of the process of the invention, the entire emulsion thus formed is brought to a predetermined temperature prior to the next step. It has been found that if this emulsion is brought to a temperature such that the liquid nonvolatile organic water repellent composition is fully dissolved and homogeneous, the final composition will have improved stability. This temperature is determined before the emulsion is made by analysis of the nonvolatile organic water repellent composition. The temperature of the nonvolatile organic water repellent composition is raised to such a point that the nonvolatile organic water repellent composition is visully clear. Thus, all of the ingredients form a homogeneous solution. This temperature would be comparable to the temperature used to dissolve the ingredients of the nonvolatile organic water repellent composition in the first instance. However, this temperature could be somewhat lower since once dissolved, the components tend to stay in solution at lower temperatures.

As noted above, with the exception of the optional temperature adjustment just discussed, this is a conventional process for forming an emulsion using the described emulsifier but it results in a compostion that has a very high viscosity and large particle size. We have found that subsequent processing in devices such as high-pressure homogenizers, microfluidizers, ultrasonic wave generators, and colloid mills reduces the particle size and viscosity and improves performance of the composition. It is generally accepted that emulsification is accomplished due to kinetic energy dissipation through turbulence, cavitation, shear and possibly impact or decompression. A thorough examination of such mechanisms is described in the Encyclopedia of Emulsion Technology, Volume 1, pgs 57-127 "Formation of Emulsions" by P. Walstra (Marcel Dekker, N.Y., 1983).

The following are examples of high kinetic energy devices with useful ranges of operation:

1. Homogenizers/Microfluidizers

These are devices capable of pumping liquids under high pressures (1,000-20,000 psig) which are then forced through a narrow orifice or slit (0.01-1 mm). Potential energy is converted to kinetic energy as the liquid is accelerated to high velocities (100-1,000 m/sec). The kinetic energy is dissipated into heat during passage through the valve, and in this short time (0.01-1 mSec) turbulence, cavitation and shear result in particle size reduction and viscosity loss. Energy densities of $10^3$ to $10^{14}$ W/m$^3$ are attainable. Examples of homogenizers include Gaulin or Rannie homogenizers made by APV Homogenizers, 500 Research Dr. Wilmington, Mass. 01887. Microfluidizers are described in U.S. Pat. No. 4,533,254 entitled "Apparatus for Forming Emulsions" and are sold by Microfluidics Corporation, 90 Oak St., Newton, Mass. 02164.

2. Ultrasonic Wave Generators

These are devices capable of converting electrical energy to mechanical vibrations in the form of ultrasonic waves (6-40 kHz) may be used to emulsify the water-repellent compostion. An example is the Model 350 "Sonifier" made by Branson Ultrasonics Corporations, Eagle Rd., Danbury, Conn. 06810.

3. Colloid Mills

Any of a variety of rotor/stator devices utilizing a narrow gap or slit (0.01-1 mm) capable of producing high shear rates ($10^3$-$10^7$/sec) may be used to emulsifiy the composition. Variations include the use of smooth or rough rotors or rotors with blades to impart turbulence in addition to shear. An example includes the Krupp Industrie Technik S-10 available from Krupp AG (Germany).

In a preferred embodiment, the final emulsion is made by first subjecting the water solution of the hydrophobically modified polyacrylic acid polymer to high kenitic energy processing followed by simple mixing of the nonvolatile organic water repellent composition. This produces a final product with good viscosity (10-100 cp) but a particle size that is as low as 3 microns. This process has the advantage that the viscosity of the final product can be somewhat independent of the particle size.

In another preferred embodiment, the product just described is itself further processed using high kenitic energy processing to produce the final product. This produces a product having still lower particle size, typically as low as 0.5 microns. Pretreating the aqueous phase allows for higher concentrations of the oil phase while maintianing desired viscosity. An additional advantage is that lower viscosity intermediate product can be processed using lower pressure equipment resulting in lower cost and higher output.

The surface tension modifier can be added at various stages of the process. As noted above, it can be added after the initial formation of the initial oil-in-water emulsion. This is the preferred point in the process for adding the surface tension modifier. It can also be added after the initial emulsion has been processed in the high kinetic energy process as just described. It is interesting to note that inferior results are obtained if the surface tension modifier is added before the hydrophobically modified polyacrylic acid polymer is added. This is further evidence that the hydrophobically modified polyacrylic acid polymer is acting in a manner different from a conventional surfactant.

An unexpected advantage of the compositions of the invention is that they have a milky white color. The milky white color is helpful because of its visibility during application. The user is able to see what has already been coated. However, upon drying, the milky white color is replaced with a clear smooth coating, unless, of course, colorants have been added to the composition.

The major portion of the coating compositions of the invention is water. Typically, water accounts for about 20 to about 95 weight percent of the compositions, preferrably about 60 to 90 weight percent and most preferrably about 75 to 85 weight percent in the final product.

The nonvolatile organic water repellent composition (including whatever volatile solvent might be necessary) typically accounts for about 5 to 80 weight percent of the composition. The individual components of the nonvolatile organic water repellent composition (including any volitile solvent necessary) can vary widely. The following table gives the useful and preferred ranges, in terms of weight percent of the total composition.

| Component | Useful Range | Preferred Range |
|---|---|---|
| wax | .05–10 | 2.0–5.0 |
| hydrocarbon resin | 0.05–35 | 4.0–10.0 |
| fragrance | .05–2 | 0.1–0.3 |
| Preservative | 0.5–2 | 0.8–1.0 |
| organic solvents | 5–80 | 10–25 |

The preferred hydrocarbon resin is a mixture of C5 hydrogenated hydrocarbon resin and polyisobutylene. The C5 resin is preferrably present in an amount of from about 4 to 6 percent by weight of the total composition and the polyisobutylene is present in an amount of about 1 to 4 percent by weight of the total composition.

The compositions of the invention contain an emulsion stabilizing amount of a hydrophobically modified polyacrylic acid polymer. The exact amount depends on the amount of nonvolatile organic water repellent composition and is typically between about 0.01 to about 5 weight percent of the composition, with a preferred range of between about 0.05 and 3 weight percent, the most preferred range being between about 0.05 and 2.0 weight percent. These weight percents do not include the neutralizing compound which is present in an amount sufficient to cause the hydrophobically modified polyacrylic acid polymer to form a gel in water. This amount is typically between about 0.05 and 5 weight percent with a preferred range being between about 0.1 and 4 weight percent of the total composition.

In some embodiments, the composition of the invention includes a surface tension modifier that is added after initial emulsion formation or at the end of the process after the desired viscosity and particle size have been achieved. The surface tension modifier can be present in the composition at about 0.05 to about weight percent and preferrably between about 0.1 and 0.3 weight percent.

In a preferred process, a concentrated initial emulsion is prepared (relative to the final product); this concentrate is then subjected to high kenitic energy processing; and in a final step, the product is diluted to its final concentration. This results in smaller particle size and increased productivity. It is desirable to process a composition that is about 60 percent water, about 40 percent nonvolatile organic water repellent composition and then dilute the resulting composition to about 80 percent water 20 percent nonvolatile organic water repellent composition. Mean particle sizes of about 0.5 microns can be easily achieved by this process.

The water repellent compositions of the invention can be applied to any porous substrate, particularly architectural materials. Architectural materials to which the coating compositions can be applied include wood, brick, masonry, concrete, tile and stucco. The term masonry used herein is meant to describe any inorganic substrate, particularly building compositions and includes, but is not limited to, structural materials such as common brick, paving brick, face brick, drain tile, hollow block, terra cotta, conduits, roofing tile, flue lining, cements such as Portland cement, calcined gypsum products, i.e., molding and building plaster and stucco, magnesia cement, insulation products such as electrical and thermal insulators (diatomaceous earth brick.)

The coating compositions of this invention can be applied to the substrate to be treated by those methods used to apply organic solvent based and water based coating compositions. Such methods include brush or roller application, flood coating or dip coating. Because of the advantageous viscosity of these compositions, they can also be sprayed.

The following examples are presented for a further understanding of the invention.

EXAMPLES

The following is a typical preparation according to the invention. (The detailed description which follows describes the formation of Composition 5 in Table 1.)

The water solution was prepared by adding Carbopol ® 1342 to warm water (90–°120° F.) with sifting action and dispersing at 2000–4000 RPM with Cowles mixing blade. The solution was mixed until all of the Carbopol ® was dissolved into the water so that there were no particles or lumps. A bacteriostatic preservative, Nuosept ® 95, was slowly added. The Nuosept ® 95 preservative neutralized the solution and it became somewhat viscous and stringy in nature. (Brookfield Viscosity=10,000 Cps (#3 spindle @ 2.5 RPM) and 2,000 Cps (#3 spindel @ 50 RPM) at 100° F.).

A nonvolatile organic water repellent composition was prepared by dissolving paraffin wax, a fully hydrogenated C5 hydrocarbon resin, polyisobutlyene and pine oil in a petroleum distillate solvent.

Vigorous stirring of the water solution with the nonvolatile organic water repellent composition produced an emulsion having organic droplets having a particle size of about 8 to 10 microns and having a viscosity of about 800 to 1,000 Cps. The surface tension modifier was then added to the emulsion (Surfynol ® TG).

This emulsion was then processed in a microfluidizer operated at a pressure of about 9,000 psi ±2,000. The result was a stable emulsion having a particle size of about 1 micron and a viscosity of about 10-30 Cps.

The water repellency of this coating composition was tested by applying the composition to various substrates and was tested in accordance with the following U.S. Federal specifications.

A. Requirement for Water Repellency on Masonry as outlined in Par. 3.5 of Federal Specification SS-W-110C, Par. 4.3.2, except concrete brick was used as the substrate and the substrate was allowed to dry for seven days before testing. In this test, a concrete brick is placed in water for 24 hours and then weighed to determine the percent water absorbed. The brick is redried and then immersed in the coating composition for 10 seconds. After the brick is permitted to dry for seven days, the brick was immersed for 72 hours.

B. Requirement for Water Repellency on Wood as outlined in Par. 3.7 of Federal Specification TT-W-572B, Par. 4.3.4. In this test, matched pine wafers are immersed in the coating composition for 30 seconds and then allowed to dry for seven days. The wafers are then placed into a measuring device equipped with a micrometer and placed in water for 30 minutes. The amount of swelling is calculated by comparing the original wafer thickness to the thickness exhibited by the wafer after being immersed in water.

In a similar manner, several other compositions were prepared and tested. Five compositions of the invention were made (1-5) and a comparative composition (6C) which did not meet the viscosity requirements of the invention after an initial microfluidization process. The compositions are shown in Table 1 and 1A and the results of the testing are shown in Table 2. All amounts are expressed in weight percent based on the final composition.

TABLE 1

| Composition | Useful Compositions of the Invention | | | | | |
|---|---|---|---|---|---|---|
| | 1 | 2 | 3 | 4 | 5 | 6C |
| Ingredients | | | | | | |
| Water | 94.3 | 79.6 | 86.4 | 50 | 81 | 87.2 |
| Hydrophobically modified polyacrylic acid polymer | 0.2 | 0.2 | 0.1 | 0.1 | 0.1 | 0.5 |
| Ammonia | 0.5 | 0.2 | 0.5 | 0.2 | 0 | 0.2 |
| Preservative Nuosept ® 95 | 0 | 0 | 0 | 0 | 0.2 | 0 |
| Paraffinic wax | 0 | 0 | 5 | 2.5 | 2.85 | 2.5 |
| Dow Corning Fluid 200 | 3.0 | 0 | 0 | 0 | 0 | 0 |
| Dupont Zonyl ® PHS | 0 | 20.0 | 0 | 0 | 0 | 0 |
| Linseed Oil | 0 | 0 | 10.0 | 0 | 0 | 0 |
| C5 Hydrocarbon Resin | 0 | 0 | 0 | 2.5 | 4.15 | 0 |
| Surface Tension Modifier Surfynol ® TG | 0 | 0 | 0 | 0 | 0.3 | 0 |
| Iron Oxide dispersion | 0 | 0 | 0 | 0.5 | 0 | 0 |
| Polyoxoaluminum Monostearate | 0 | 0 | 0 | 0 | 0 | 5.0 |
| Long Oil Alkyd | 0 | 0 | 0 | 15.0 | 0 | 0 |

TABLE 1-continued

| Composition | Useful Compositions of the Invention | | | | | |
|---|---|---|---|---|---|---|
| | 1 | 2 | 3 | 4 | 5 | 6C |
| Preservative (mildewcide Polyphase ® P100) | 0 | 0 | 0 | 0.5 | 0 | 0 |
| Solvent (ester alcohol) | 0 | 0 | 0 | 1.0 | 0 | 0 |
| Petroleum Distillates | 0 | 0 | 0 | 27.7 | 8.1 | 0 |
| Initial Viscosity (Cps) | 289 | 544 | 1780 | 60.2 | 1000 | 9700 |
| Final Viscosity (Cps) | 10.7 | 45.6 | 8.36 | 49.9 | 20 | 442 |
| Initial Particle Size (microns) | 105.5 | 28.0 | 369.5 | 10.2 | 10 | 82.7 |
| Final Particle Size (microns) | 12.8 | 2.3 | 8.1 | 4.7 | 1 | 23.8 |

TABLE 1A

| Hydrophobically modified polyacrylic acid polymer | Example | Patent Reference |
|---|---|---|
| Pemulan ® TR2 | 1 | U.S. Pat. No. 4,923,940 |
| Pemulan ® TR1 | 2 | U.S. Pat. No. 4,923,940 |
| Carbopol ® 1621 | 3 | U.S. Pat. No. 4,923,940 |
| Carbopol ® 1382 | 4 | U.S. Pat. No. 4,923,940 |
| Carbopol ® 1342 | 5 | U.S. Pat. No. 4,923,940 |
| Rheolate ® 5000 | 6C | U.S. Pat. No. 4,509,949 |

TABLE 2

| Test | 1 | 2 | 3 | 4 | 5 | 6C |
|---|---|---|---|---|---|---|
| Water Repellency on Masonry | | | | | 0.5% | |
| Water Repellency on Wood (Pre MF) | 25.5 | 57.5 | 32.5 | 20.7 | 42.0 | 53.0 |
| Water Repellency on Wood (Post MF) | 32.3 | 67.3 | 55.3 | 28.8 | 76.6 | 66.9 |
| Weight Gain | | | | | 1.0 oz | |

As will be noted from the results in Table 2, all examples show an increase in water repellency after microfluidization. Some hydrophobic chemicals were inherently better water repellents than others and not all will pass the Federal Specifications. However, all experience better performance on wood when there is a reduction in viscosity and particle size.

Thus, the compositions of the invention had excellent water repellency characteristics. In addition, because of their low viscosity, they were easy to apply. For example, composition 6C, a comparative example, has a viscosity of no less than 442 Cps. Such a composition would be difficult if not impossible to spray with a pump-up low pressure sprayer.

EXAMPLE USING CONCENTRATE

The above process was repeated using the components of composition 5 except that all components except water were doubled in concentration and the water was reduced accordingly. Thus, the composition contained about 60 percent water, 40 percent nonvolatile organic water repellent composition. This composition was heated to about 45° C. and passed through a homogenizer at 14,500 psig (about 1000 bar). The composition was then diluted 1:1 with water to produce a composition having about the composition of composition 5 described above.

The mean particle size was about 0.7 microns and the viscosity was about 30 cp.

The composition was tested for stability by measuring the particle size as a function of time for about 2 months and there was no substantial change. Also, there was no visible phase separation over the two month test.

The present invention has been described with particular reference to preferred embodiments thereof but it will be understood that variations and modifications can be effected within the spirit and scope of the invention.

We claim:

1. A coating composition comprising an emulsion having water as a continuous phase and, as a discontinuous phase, droplets of a nonvolatile organic water repellent component, the emulsion containing an emulsion stabilizing amount of a hydrophobically modified polyacrylic acid polymer wherein the viscosity of the emulsion is less than about 100 Cps and the particle size of the droplets is less than about 50 microns.

2. A coating composition according to claim 1 wherein said hydrophobically modified polyacrylic acid polymer is a polymer derived from a monomeric mixture containing:
   a) 95.9 to 98.8 weight percent of an olefinically unsaturated carboxylic monomer selected from the group consisting of acrylic, methacrylic and ethacrylic acids,
   b) about 1 to about 3-5 weight percent of an acrylate ester of the formula:

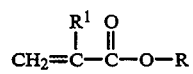

wherein R is an alkyl radical containing 10 to 30 carbon atoms and $R^1$ is hydrogen, methyl or ethyl; and
   c) 0.1 to 0.6 weight percent of a polymerizable crosslinking polyalkenyl polyether of a parent polyhydritic alcohol containing more than one alkenyl ether group per molecule wherein the parent polyhydritic alcohol contains at least 3 carbon atoms and at least 3 hydroxyl groups.

3. A coating composition according to claim 2 wherein said hydrophobically modified polyacrylic acid polymer is present in an amount from about 0.01 to 5 weight percent of said composition.

4. A coating composition according to claim 1 wherein said nonvolatile organic water repellent component comprises:
   a) from about 0.5 to 10 weight percent of said composition of wax;
   b) from about 0.05 to 35 weight percent of said composition of hydrocarbon resin;
   c) from about 0.05 to 1 weight percent of said composition of a surface tension modifier;
   d) wherein a), b) and c) are dissolved in from 5 to about 80 weight percent of said composition of an organic solvent.

5. A coating composition according to claim 4 wherein said wax is a paraffinic wax.

6. A coating composition according to claim 5 wherein said paraffinic wax is selected from paraffin waxes having melting points in the range of about 50° C. to about 70° C.

7. The coating composition according to claim 4 wherein said hydrocarbon resin comprises a hydrogenated C5 hydrocarbon resin.

8. The coating composition according to claim 4 wherein said organic solvent is mineral spirits.

9. The coating composition according to claim 4 wherein said surface tension modifier comprises 2,4,7,9,-tetramethyl-5-decyne-4,7-diol.

10. The coating composition according to claim 4 wherein said hydrocarbon resin comprises polyisobutylene.

11. A process for producing an emulsion having water as a continuous phase and, as a discontinuous phase, droplets of a nonvolatile organic water repellent component, the emulsion containing an emulsion stabilizing amount of a hydrophobically modified polyacrylic acid polymer, said process comprising the steps of
   a) forming a liquid nonvolatile organic water repellent component;
   b) forming a water solution of an emulsion stabilizing amount of a hydrophobically modified polyacrylic acid polymer;
   c) neutralizing the water solution formed in b);
   d) mixing the composition from a) with the neutralized water solution from b) so as to form an emulsion; and
   e) subjecting the emulsion formed in d) to high kinetic energy processing until the viscosity of the emulsion is less than about 100 Cps and the particle size of the droplets is less than about 50 microns.

12. The process according to claim 11 wherein, prior to step e), the temperature of said emulsion is brought to a temperature such that the component is fully dissolved and homogeneous.

13. The process according to claim 11 wherein the water solution of hydrophobically modified polyacrylic acid polymer is subjected to high kinetic energy process prior to step d).

14. The process according to claim 11 wherein a surface tension modifying agent is added between step d) and e).

15. The process according to claim 11 wherein said high kinetic energy processing step is microfluidization.

16. A process according to claim 11 wherein the emulsion initially has about 60 percent water, and about 40 percent liquid nonvolatile organic water repellent composition wherein said emulsion is diluted after step e) to about 80 percent water and 20 percent liquid nonvolatile organic water repellent composition.

17. A process for making an architectural material water repellent, the process comprising the steps of:
   a) coating the material with the composition of claim 1; and
   b) allowing the water continuous phase to evaporate.

* * * * *